March 23, 1965 R. H. BLACKMER 3,174,833
HYDROGEN GENERATING CANISTER
Filed May 15, 1962 2 Sheets-Sheet 1

INVENTOR
RICHARD H. BLACKMER
BY Ernest J. Weinberger
ATTORNEY

March 23, 1965 R. H. BLACKMER 3,174,833
HYDROGEN GENERATING CANISTER
Filed May 15, 1962 2 Sheets-Sheet 2

INVENTOR
RICHARD H. BLACKMER
BY Ernest J Weinberger
ATTORNEY

United States Patent Office 3,174,833
Patented Mar. 23, 1965

3,174,833
HYDROGEN GENERATING CANISTER
Richard H. Blackmer, Topsfield, Mass., assignor, by mesne assignments, to the United States of America as represented by the Secretary of the Navy
Filed May 15, 1962, Ser. No. 195,012
2 Claims. (Cl. 23—282)

This invention relates to fuel gas systems for fuel cells and more particularly, to a hydrogen gas generator of the type where the generated hydrogen is supplied to the fuel cell at a preselected constant pressure by controlling the amount of physically contacting reactants which, by their reaction, generate the gas.

Fuel cells which operate on an ion exchange principle, as for example, those that make use of an electrolyte membrane and two gases, require a constant supply of both gases and in particular the fuel gas. In effect fuel cells are electrochemical devices which supply a continuous D.C. current from an electrochemical reaction of reactants which occurs within the cell. Generally these reactants are stored externally of the cell and are introduced when the cell is operative. The fuel cell is made up of three basic parts, an anode, a cathode and an electrolyte. The electrodes function electrically as any other electrodes in addition to acting as areas for the electrochemical reactions. At the anode, oxidation occurs while the cathode supports a reduction reaction. The oxidation reaction is the removal of electrons with the attendant addition of electrons due to reduction. These electrons flow from one electrode to the other through an external circuit so long as the reactants are supplied to the fuel cell. What has taken place within the cell amounts to the electrochemical combination of hydrogen and oxygen to form water with the resultant direct production of electrical energy. This direct conversion, which avoids the wasteful heat-to-electricity cycle, accounts in part to the high efficiencies attainable from fuel cells.

The highly efficient manner in which this conversion takes place has stimulated the use of fuel cells both as portable and stationary sources of electrical power. Although the fuel cell itself can be made compact, it nevertheless is dependent for its operation on a continuous supply of the reactants as in this case, hydrogen and oxygen. The oxygen may be supplied from a bottled source wherein the oxygen is stored under great pressure, thus eliminating the problem of a continuous supply. Such, however, is not the case with hydrogen which is both difficult and dangerous to bottle especially when it is to be employed in conjunction with a portable fuel cell. Therefore, an approach presently followed is one in which easily contained and safe reactants are stored and only reacted when the fuel cell is operative. Generally the most common form of fuel gas generators is that one in which solid metal hydrides or borohydrides are decomposed. The decomposition process is carried out by releasing an aqueous solution into the hydride container and then removing the hydrogen gas produced.

The presently available devices employed as hydrogen fuel generators are all limited in one respect or another. Most are relatively large, heavy, and bulky, employing at least two physically separated chambers, are gravity fed and require a number of associated regulating systems for control of the reaction. Additionally they are expensive and not suitable for quick or rapid replacement when the reactants have become depleted or when the system is to be transported.

It is an object of this invention to provide a simple, inexpensive and practical hydrogen generator which is capable of supplying hydrogen gas at a preselected pressure.

Another object of this invention is to provide a hydrogen generator in which the reactants are caused to mix by positive forces and independently of any gravitational force while requiring only one control element to regulate the mixing.

Still another object is to provide a portable hydrogen generator which may be rapidly and efficiently detached while at the same time is safe to persons handling the same.

Other objects and many of the attendant advantages of this invention will be readily appreciated as the same becomes better understood by reference to the following detailed description when considered in connection with the accompanying drawings wherein.

Figure 1:
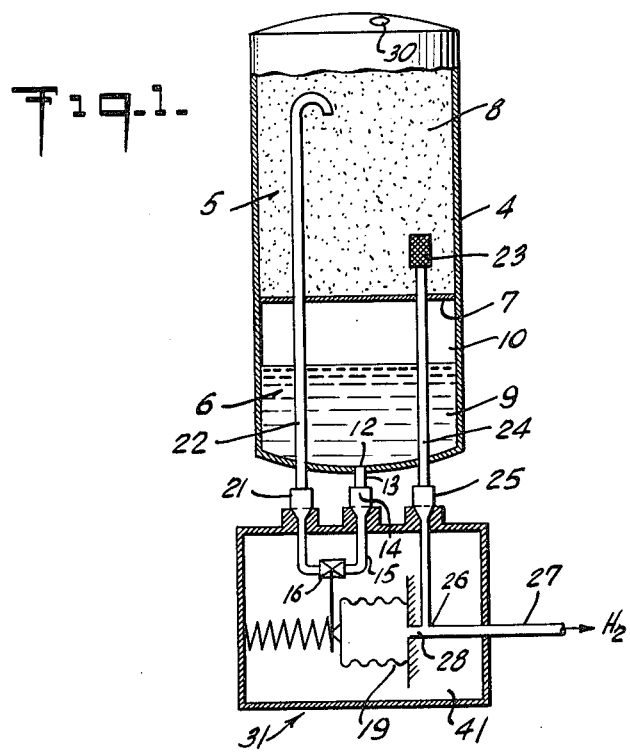
FIG. 1 is a schematic representation of an embodiment made in accordance with this invention.

In the embodiment of this invention illustrated in FIG. 1, a tank, canister or container 4 is divided into two fluid sealed compartments 5 and 6 by a wall or separator 7. The canister 4 and the separator may be of any suitable material provided it is unaffected by, and does not react with the reactants within the canister and is structurally able to withstand the pressure existing therein. Stainless steels or ceramics may be used while other more or less suitable materials are well known to those in the field. The upper compartment 5 has enclosed therein a metal hydride 8 which when reacted with an aqueous solution will liberate hydrogen gas. The metal hydrides or borohydrides for this purpose may be purchased commercially in suitable form for this purpose. That is, in powdered or mesh or foil form and thereby provide an extensive surface with which the aqueous solution may react. The lower compartment 6 is partially filled with the aqueous solution 9 and the remaining space 10 is filled with nitrogen or some inert gas under pressure. The pressure need be only of such a strength as to force or lift the aqueous solution into the upper compartment. Pressures of approximately 10 to 20 p.s.i. have been found entirely satisfactory under most conditions although higher pressures where necessary can be used provided, the canister is of sufficient strength or compensation is applied thereto.

Figure 2:
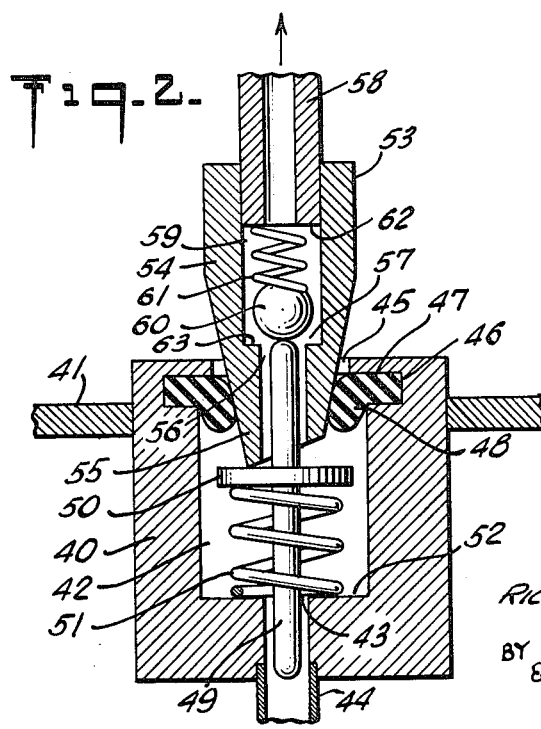
FIG. 2 is a representation of a fragmentary portion of FIG. 1 showing the quick-disconnect couplings.

In order to provide a controlled path for the aqueous solution, the lower compartment 6 is provided with an opening 12 disposed at its lowermost point and sealed thereto is a pipe 13 which terminates in a quick disconnect coupling 14 (shown in detail in FIG. 2). The other end of the coupling is joined to pipe 15 which is in serial flow relation with the valve chamber 16 (FIG. 3) thus forming therein a flow-control orifice 17. The flow of the aqueous solution through the orifice is regulated by a conical valve body 18 which, in turn, is activated by the conventional pressure responsive bellows 19 and by return or biasing spring 20. The solution that is permitted to flow through the orifice passes through the disconnect coupling 21 and along pipe 22 which may pass inwardly through the canister and into the upper compartment or may remain completely outside the canister and enter directly through an opening in the upper compartment. In either case the solution is supplied into the upper compartment, preferably at as high a point as possible so as to allow gravity to carry the solution through the metal hydride although if the pressure of the inert is relatively high the solution will be forced through the hydride even in opposition to the force of gravity.

The aqueous solution reacts with the hydride in the upper compartment and the generated hydrogen is permitted to escape therefrom through baffling 23 and pipe 24, coupling 25 and is divided into two branches at the junction 26. One branch pipe 27 carries the hydrogen to a utilization apparatus such as a fuel cell while the other branch 28 is connected directly to the bellows 19. The device in operation acts to supply hydrogen at a constant pressure since the bellows is activated substantially by the pressure of the hydrogen generated within the canister. The bellows in turn through valve 16 which it controls, meters the aqueous solution supplied and permitted to react with the hydride and thereby in effect also controls the quantity of gas generated. When the pressure of the hydrogen reaches the desired value, the bellows closes the orifice 17 by way of the conical member 18 and interrupts the supply of solution, thereby stopping the further generation of hydrogen. Subsequently as the hydrogen pressure falls below a selected value, the force exerted by the bias spring 20 overcomes that exerted by the bellows and the orifice is opened and the generation reaction commenced. The biasing force exerted by the spring can be varied by any well-known method or the point along the pivot arm 29 at which the spring force is applied may be changed so that the pressure of the generated gas may be selected. Since the reaction continues for a time after the supply of aqueous solution has been interrupted and gas is continually generated the upper compartment is provided with a fuse-like blow-out plug 30 which will release the gas therefrom if it should approach or exceed the canister safe limit.

Under certain conditions, as, for example, those of the military, it is desirable that both the fuel cell and its fuel supply be portable and capable of transport by personnel. In this regard it is essential that the various units be readily detachable and that the canister be easily replaceable when its reactants are depleted. In order to facilitate such a system the fuel generator may be divided as illustrated into two basic components which comprise the fuel pack. A lower demand regulator 31 which includes the pressure controlled valve, the bellows, spring and attendant piping and the upper component which includes the canister. The two units are coupled together by quick disconnect couplings 13, 14 and 25 which permit the separation of the two units while the canister retains its own fluid integrity. This is accomplished by the use of the particular type and design of the coupling member which is fully illustrated in FIG. 2.

The receptacle portion 40 of each of the couplings is supported and affixed to the demand regulator housing 41 and has a main chamber 42 open at opposite ends. The lower opening 43 which is generally smaller than the chamber continues as a passage through the wall of the receptacle and communicates with an outlet pipe 44 while the upper opening 45 is just somewhat smaller in diameter than the chamber although it may, if desired, be of the same size. An annular groove 46 on the inner wall of the receptacle adjacent the upper opening has confined therein an elastomeric ring 47 whose generally rounded head portion 48 extends into the chamber and forms a restricted annular opening smaller than the upper opening 45. Confined within the chamber is a generally cylindrical member 49 which is aligned lengthwise of the chamber and extends beyond the chamber openings. The member 49 is provided with a disk-like lateral extension 50 somewhat larger than the opening formed by the ring 47, which may be integral therewith or merely a disk joined thereto. A coil spring 51 coaxial with the member 49 and disposed between the disk extension 50 and the lower wall 52 of the chamber has its upper end abutting the lower disk surface and the other end abutting the lower chamber wall. The spring 51 biases the disk and the member 49 upwardly into a position where the disk abuts the lower surface of the rounded head 48 of the elastomeric ring 47.

The plug portion 53 of the coupling consists of a hollow cylindrical body 54 whose lower end 55 is conically tapered and whose edge 70 is cut at a bias. The passage 56 therethrough is of a dimension at its tapered end portion to just admit therein the upper end of member 49 while the rest of the passage is enlarged at 57. The opposite enlarged end of the passage has confined therein a pipe 58 which, in effect, restricts the opening to the inner diameter of the pipe and forms a chamber 59 therebetween. A sphere 60 slightly larger than the lower passage and a coil spring 61 are vertically positioned lengthwise of the chamber 59. The spring abuts the edge 62 of the pipe and the sphere in turn rests against the abutment 63 formed at 57 due to the biasing action of the spring. The taper of body 54 and the lower passage therethrough are of a length and size such that as the plug 53 is inserted into the receptacle the elastomeric ring 47 will firmly engage the outer peripheral wall of the taper and form a fluid seal while a part of the lower edge 70 contacts the upper surface of disk 50 and acts in opposition to spring 51. This action causes the portion of member 49 above the disk to force the sphere 60 away from the abutment 63 and thereby permit fluid communication between the plug and the receptacle while forming a seal to the exterior. On the other hand as the plug is removed from the receptacle the springs in each urge the disk in one to abut the ring and the sphere in the other to abut the shoulder 63 and close the opening. The material forming the various components of the coupling can be selected from a large variety bearing in mind that they must be structurally sound for the intended application and remain unaffected by the fluids passing through them. A number of metals satisfy these requirements and have been successfully employed.

With the above described arrangement it is clear that the entire generator may be constructed so as to be portable with the additional feature that the two parts, the canister and the regulator can be separated with complete safety.

Figure 3:
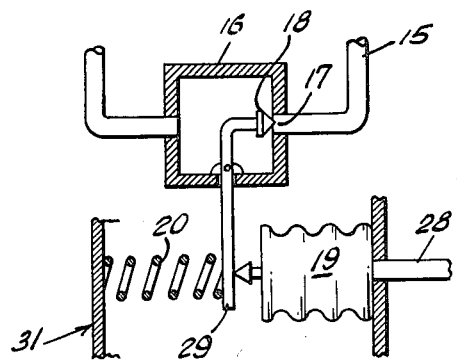
FIG. 3 is an exploded view of the valve chamber 16 of FIG. 1.
Figure 4:
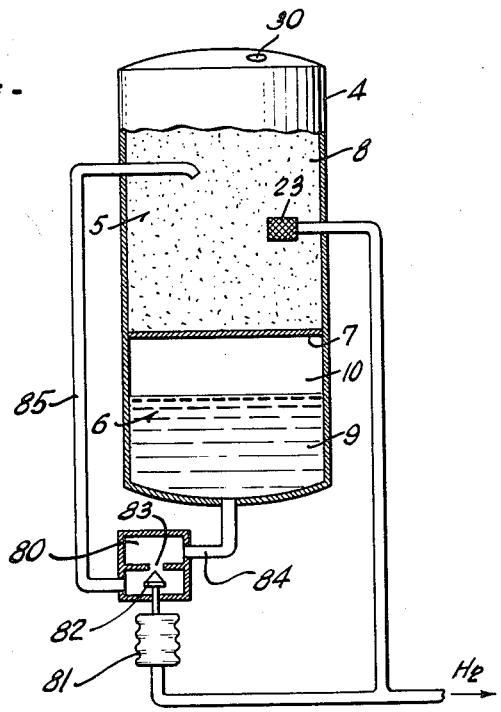
FIG. 4 is a modified embodiment of the invention similar to that of FIG. 1.

Ilustrated in FIG. 3 is another embodiment of the invention similar to that of FIG. 1 except that the pipes connecting the compartments of the canister extend exteriorly of the canister and the quick disconnect couplings have been eliminated and a modified pressure responsive valve substituted. In this embodiment the entire device is one complete integral unit and cannot be separated. The valve 80 is of a somewhat simpler variety in that the bellows 81 directly drives the conical closure head 82 without an opposing biasing means into the restricted orifice 83 between the pipe 84 supplying the aqueous solution and the inlet pipe 85 for the upper compartment. This form of the generator can be fabricated somewhat more compactly than the previously described embodiments, but is not quite as versatile nor can the canister be as readily recharged.

Each and every novel feature and combination of novel features present in or possessed by the mechanism (or process or product) herein disclosed.

I claim:

1. A device for the generation of hydrogen gas which comprises:
    a closed container divided into two fluid sealed compartments, one of said compartments disposed vertically above the other,
    the upper compartment thereof having therein a metal hydride capable of reacting with an aqueous solution to produce as one product of the reaction hydrogen gas,
    the lower compartment thereof being partially filled with water and that unfilled portion disposed between said solution and said upper compartment containing an inert gas under pressure,
    fluid outlet means connected to said lower compartment below said inert gas and in communication with said water, fluid inlet means connnected to said upper compartment in communication with the interior thereof, gas outlet means communicating with the interior of said upper compartment for removing the hydrogen gas generated therein by the reaction, a coupling arrangement between said fluid inlet and outlet means having connected therein quick disconnect means which seal against passage of fluid therethrough when they are disconnected and a fluid control valve having an arm controlling the activity of said valve, a bellows operatively connected to said gas outlet means for expansion and contraction dependent on the gas pressure, said arm connected to said bellows for movement therewith whereby the pressure of said hydrogen gas will control the passage of water between said compartments.

2. The device according to claim 1, wherein each of said quick disconnect means comprise:

a pair of fluid tight mating connector members each having a passage therethrough, one of said members being a receptacle and the other a plug, said passage in each member having an enlarged central portion forming a chamber with abutments at each end thereof, sealing means confined in said chamber and movable lengthwise therein, biasing means normally biasing said sealing means across said passage and into engagement with one of said abutments thereby restricting the passage of fluid therethrough, opposing means carried by said plug and receptacle for displacement of said biasing means when said connectors are in mating relationship whereby fluid may pass therethrough only when said members are mated.

References Cited by the Examiner

UNITED STATES PATENTS

| | | | |
|---|---|---|---|
| 713,658 | 11/02 | Mackenzie | 48—32 |
| 738,827 | 9/03 | May | 48—34 |
| 767,289 | 8/04 | Kirkwood | 23—282 |
| 988,645 | 4/11 | Martin | 48—37 |
| 2,503,495 | 4/50 | Koester | 251—149.6 |

FOREIGN PATENTS 448,391  8/27  Germany.

MORRIS O. WOLK, Primary Examiner.

JAMES H. TAYMAN, Jr., Examiner.